United States Patent
Cecchetti et al.

(10) Patent No.: US 9,323,923 B2
(45) Date of Patent: Apr. 26, 2016

(54) CODE REPOSITORY INTRUSION DETECTION

(71) Applicant: Deja vu Security, LLC, Seattle, WA (US)

(72) Inventors: Adam Cecchetti, Seattle, WA (US); Michael Eddington, Seattle, WA (US)

(73) Assignee: DEJA VU SECURITY, LLC, Seattle, WA (US)

( * ) Notice: Subject to any disclaimer, the term of this patent is extended or adjusted under 35 U.S.C. 154(b) by 420 days.

(21) Appl. No.: 13/692,650

(22) Filed: Dec. 3, 2012

(65) Prior Publication Data
US 2013/0340076 A1    Dec. 19, 2013

Related U.S. Application Data

(60) Provisional application No. 61/661,617, filed on Jun. 19, 2012.

(51) Int. Cl.
*G06F 21/55* (2013.01)
*G06F 9/44* (2006.01)
*G06F 21/56* (2013.01)

(52) U.S. Cl.
CPC *G06F 21/55* (2013.01); *G06F 8/71* (2013.01); *G06F 8/73* (2013.01); *G06F 21/552* (2013.01); *G06F 21/563* (2013.01); *G06F 21/564* (2013.01)

(58) Field of Classification Search
CPC .............. G06F 21/55; G06F 8/73; G06F 8/71
USPC ..................................................... 726/22, 23
See application file for complete search history.

(56) References Cited

U.S. PATENT DOCUMENTS

| | | | | |
|---|---|---|---|---|
| 5,956,510 | A * | 9/1999 | Nicholas | G06F 8/78 707/999.004 |
| 7,069,589 | B2 * | 6/2006 | Schmall | G06F 21/563 713/188 |
| 7,448,084 | B1 * | 11/2008 | Apap | G06F 21/552 726/22 |
| 2004/0030912 | A1 * | 2/2004 | Merkle, Jr. | G06F 21/10 726/26 |
| 2005/0234920 | A1 * | 10/2005 | Rhodes | G06F 21/552 1/1 |
| 2006/0004528 | A1 * | 1/2006 | Uehara | G06F 8/71 702/20 |
| 2006/0282660 | A1 * | 12/2006 | Varghese | G06Q 20/341 713/155 |
| 2007/0083933 | A1 * | 4/2007 | Venkatapathy | G06F 21/577 726/25 |

(Continued)

OTHER PUBLICATIONS

U.S. Appl. No. 61/641,007, filed May 2012, Kumar et al.*

*Primary Examiner* — Hadi Armouche
*Assistant Examiner* — Sher A Khan
(74) *Attorney, Agent, or Firm* — Amin, Turocy & Watson, LLP

(57) ABSTRACT

The disclosed subject matter provides for code repository intrusion detection. A code developer profile can be generated based on characteristic features present in code composed by the developer. Characteristic features can be related to the coding propensities peculiar to individual developers and, over sufficient numbers of characteristic features, can be considered pseudo-signatures. A target code set is analyzed in view of one or more developer profiles to generate a validation score related to a likelihood of a particular developer composing a portion of the target code set. This can serve to confirm or refute a claim of authorship, or can serve to identify likely author candidates from a set of developers. Where the target code set authorship is determined to be sufficiently suspect, the code set can be subjected to further scrutiny to thwart intrusion into the code repository.

25 Claims, 10 Drawing Sheets

(56) References Cited

U.S. PATENT DOCUMENTS

| | | | | |
|---|---|---|---|---|
| 2007/0250810 | A1* | 10/2007 | Tittizer et al. | 717/110 |
| 2008/0229290 | A1* | 9/2008 | Jones | G06F 8/71 717/137 |
| 2008/0263505 | A1* | 10/2008 | StClair | G06F 8/10 717/101 |
| 2008/0301639 | A1* | 12/2008 | Bell et al. | 717/120 |
| 2009/0300589 | A1* | 12/2009 | Watters | G06Q 40/00 717/140 |
| 2011/0023118 | A1* | 1/2011 | Wright | G06F 11/28 726/23 |
| 2011/0179490 | A1* | 7/2011 | Jin | G06F 21/552 726/24 |
| 2012/0036492 | A1* | 2/2012 | Armstrong | G06F 8/30 717/100 |
| 2012/0047173 | A1* | 2/2012 | Thomas | G06F 21/552 707/777 |
| 2012/0151586 | A1* | 6/2012 | Hentunen | G06F 21/563 726/24 |
| 2013/0298242 | A1* | 11/2013 | Kumar et al. | 726/25 |

\* cited by examiner

CODE REPOSITORY INTRUSION DETECTION

CROSS-REFERENCE TO RELATED APPLICATIONS

The present application claims priority to U.S. Provisional Patent Application No. 61/661,617, entitled "SOURCE ANALYSIS AND INTRUSION DETECTION FOR COMPUTING SYSTEMS," filed on Jun. 19, 2012, which is hereby incorporated by reference in its entirety.

TECHNICAL FIELD

The disclosed subject matter relates to characterizing features of information to be stored electronically and, more particularly, to analysis of features to determine confidence in an identity associated with information to be stored electronically.

BACKGROUND

By way of brief background, information can be stored electronically in data stores. As an example, one common use of a data store is to store computer programming code or source code electronically. These exemplary data stores for computer programming code can facilitate code developers' access to the stored source code. As such, a developer can typically access source code, update the source code, and store the updated source code in the data store. In an aspect, the developer can be local to the data store, although it is common for the developer to be located remote from the data store. Remote access to the data store for interacting with computer programming code can facilitate a geographically diverse set of code developers. Further, such exemplary data stores can typically facilitate interaction with computer programming code by a plurality of code developers among other users. In some embodiments, source code databases can be quite large, even spanning multiple data stores, and can support interaction with many thousands of code developers and other users.

Code repositories, e.g., data stores with computer programming code stored thereon, can be significant corporate or governmental investments and can include valuable source code or information. This valuable source code or information can, for example, include proprietary source code or information, include code for significant products or families of products such as flagship software products, include code for sensitive systems or operations such as security/military systems or patient records management systems, etc. Security for access to the computer programming code can be detailed, complex, and highly evolved. However, accessing code repositories despite security systems can occur and source code can be committed or checked-in to a code base stored on the data stores in a manner that can be undesirable. Conventional mechanisms to address these types of situations generally involve significant manual review of committed code patches by review personnel. These mechanisms can be expensive, inconvenient, tedious, and slow.

DETAILED DESCRIPTION

Figure 1:
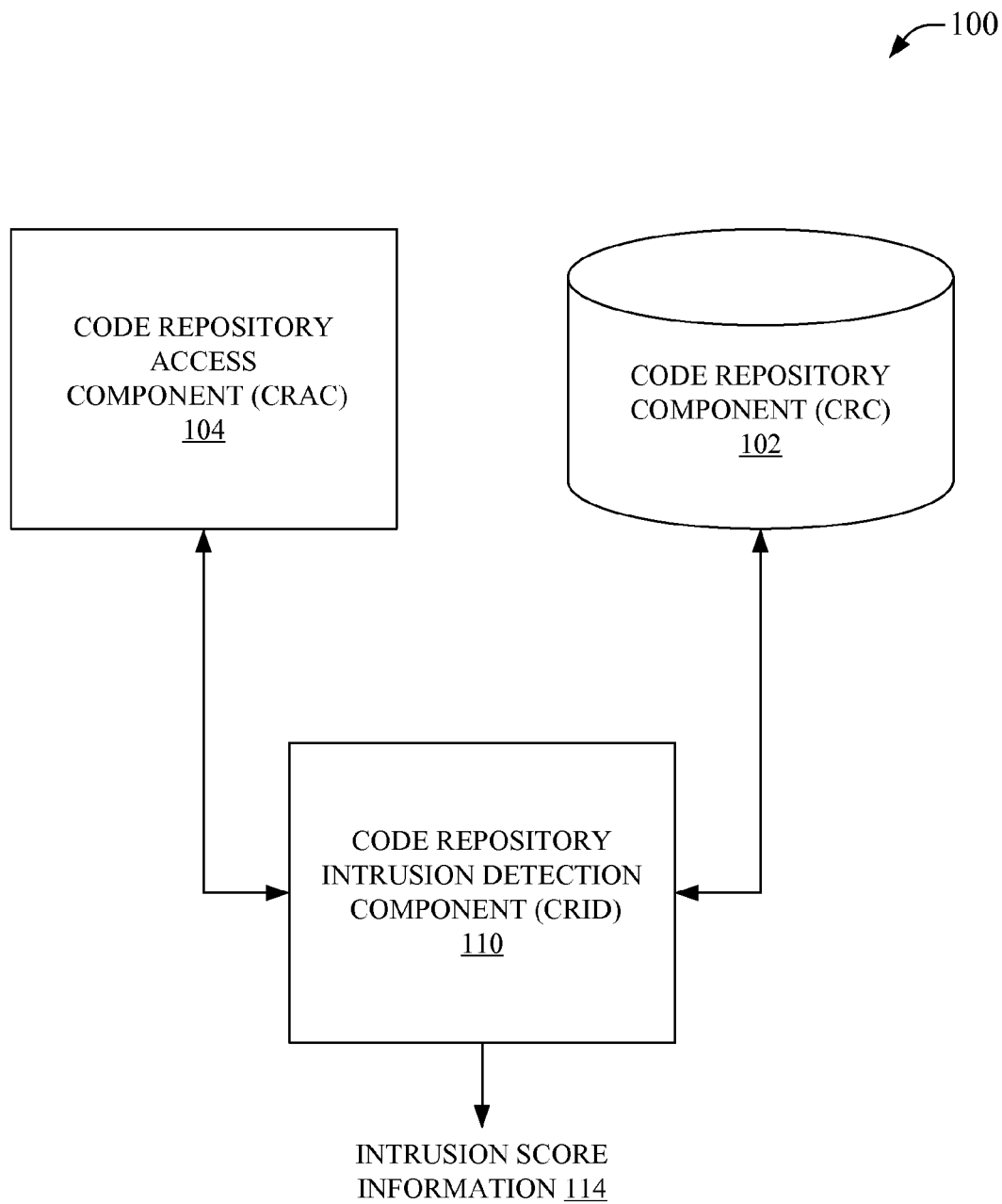
FIG. 1 is an illustration of a system that facilitates code feature analysis in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Computer programming code can be stored in code repositories residing on data storage components. Computer programming code, used herein interchangeably with the term 'source code' unless explicitly stated otherwise, is meant to include any description of a software system and can be construed to include machine code, very high level languages or executable graphical representations of systems. The computer programming code can generally be accessed by developers to facilitate development of the code stored in the code repository. Computer programming code can represent a significant investment in terms of development and intellectual property to the owners of the code. Code can also be associated with sensitive information or security/military concerns. As an example, a code repository housing source code for operation of nuclear reactors can be considered a highly sensitive code repository. It can be desirable to include safeguards to protect code repositories. Insertion of malicious code into a code base can represent a real threat to the owner of the code. As an example, malicious code can include code allowing unauthorized entities to access associated computer systems.

Generally, only trusted developers are allowed access to sensitive code or code repositories. However, as malicious programmers become more sophisticated, in some cases even feasibly being supported by competing corporations or governments, the ability to commit malicious code surreptitiously to a code repository by bypassing traditional security measures or masquerading as a trusted developer is becoming more common. As an example, a competing company can approach a trusted developer, who could be bribed to submit a malicious code patch into a code repository that, if incorporated into a built product, could allow the competitor to access the product, cause problems with the deployed product, etc., to give an advantage to the competitor.

Detecting such intrusions into a code repository can be highly challenging for conventional systems. One common approach can include hiring a computer forensics team to reconstruct the revision process of source code to try to locate when malicious code was inserted. One problem with this approach is that, especially with large or complex source code, this can be extraordinarily expensive in both time and money. Further, due to the expenses, this approach can often only be undertaken after a problem has been detected in the code or deployed product. Another approach can include spot-checking of code submissions, such as having code patches randomly reviewed by other developers to try to catch malicious code before it is incorporated into a build of a product. This approach can obviously miss malicious code where a skilled developer can game the system to avoid the review or where there simply are not enough review sessions to catch a statistically significant amount of malicious code submissions.

Often, literary authors are associated with a style of writing, some so strongly that even small segments of their work can be easily recognized simply by the style of their compositions. This same personal style is also frequently found for musical composers or artists. Given a large enough number of characteristics, an author, composer, or artist, could be associated with a profile that could reasonably be employed to classify works with the author, composer, or artist. Similarly, as disclosed herein, authors of computer programming code, e.g., developers, can also be associated with code characteristics. As an example, a developer can frequently link a specific set of libraries, employ a particular keystroke sequence for starting a programmatic comment, capitalize variable names in a predictable manner, repeatedly employ certain function calls, submit (or, in the inverse, not submit) code at a predictable time of day or on specific days, etc., and the particular combination and weighting of these characteristics can be associated with that developer's code. As greater numbers of characteristics or characteristics that are more unusual are included, the association of those characteristics with a piece of that developer's code can act as a signature of sorts.

As disclosed herein, machine learning, statistical inference, normalization, Bayesian filtering, or other mechanisms can be employed in analysis of a developer's coding characteristics to determine a profile for that developer. A developer profile can then be employed in analysis of a target set of code to determine a likelihood that that developer composed the target code. An advantage of applying these techniques is that potentially huge numbers of characteristics can be analyzed and weighted in developing profiles of developers. Further, where large sets of code for a developer are available over time, these analysis mechanisms can also allow a profile to identify changes in a developers maturing coding style such that analysis of a target code set could also be informative as to when a piece of code was composed by the developer in much the same manner as Picasso's blue period can be distinct from his rose period or cubist period, although each period can still be termed strongly 'Picasso'.

Where developer profiles can be determined, code check-ins can be analyzed in view of the profile of the purported developer to facilitate determinations of code repository intrusion. As an example, where a developer always includes the following numerical sequence, "112358132134", somewhere in every piece of code she has drafted in the last 15 years, it can be unlikely that a piece of code she submitted to a code repository last week was composed by her where "112358132134" is not present in the submitted code. As such, where the exemplary numerical sequence is missing, the code can be subject to additional scrutiny.

The following presents other simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate the execution of computer-executable instructions stored on the memory. The execution of the computer-executable instructions can cause the processor to receive a code file set and to identify a characteristic feature associated with the code file set, a code file of the code file set, or a computer instruction of a code file of the code file set, wherein one or more code file of the code file set comprises source code. The processor can further determine a feature value related to the characteristic feature and facilitate access to the feature value.

In another embodiment, a method can include receiving, by a system including a processor, a code file set including one or more code files comprising source code. The method can further include the processor identifying a characteristic feature present in at least a portion of the code file set and determining a feature score for the characteristic feature. The method can further include the processor facilitating access to the feature score.

In a further embodiment, a device can include a memory storing computer-executable instructions and a processor that facilitates execution of the computer-executable instructions. These instructions can cause the processor to receive a target code file set. One or more code file of the target code file set can comprises source code. The instructions can further cause the processor to identify a characteristic feature associated with the target code file set, a code file of the code file set, or a computer instruction of a code file of the code file set and determine a feature value related to the characteristic feature. The processor can further receive a developer profile comprising a set of characteristic feature values associated with the presence of characteristic features correlated to historical code files associated with the developer profile. Based on a determined level of confidence that the target code set is authored by a developer associated with the developer profile, the processor can determine an intrusion score.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates code feature analysis in accordance with aspects of the subject disclosure. System 100 can include code repository component (CRC) 102. CRC 102 can comprise a memory, data store, or other data storage component, where code can be stored to facilitate developer access. System 100 can further include code repository access component (CRAC) 104 that can facilitate access to CRC 102. As an example, CRAC 104 can be a web interface for CRC 102 allowing developers to check code in and out of the code repository, e.g., CRC 102. CRAC 104 can be communicatively coupled to CRC 102 by way of code repository intrusion detection component (CRID) 110. In an aspect, CRID 110 can be inserted into the communicative coupling between CRAC 104 and CRC 102 to facilitate aspects of the presently disclosed subject matter, such as training CRID 110 developer profiles, intrusion detection, etc.

CRID 110 can facilitate determining intrusion score information 114 for code sets. A code set can include one or more lines of code. Code in a code set can be related, such as where the lines of code comprising the code set are for a single project, program, function, etc. In an aspect, the code set can include groups of code that are not directly related, for example, where a code set includes code snippets, i.e., a small region of code generally smaller than a code base, for more than one project housed in a code repository. A code base of a programming project can be the larger collection of source code of the computer programs that comprise the project. In another aspect, the code set can be an empty set having no lines of code.

In an aspect, the determination of intrusion score information 114 can be based on a comparison of a developer profile to a code set. Intrusion score information 114 can be a metric for identifying possible submission of code to a code repository, e.g., CRC 102 by way of CRAC 104, which may not be composed by a designated developer. As an example, intrusion score information 114 can include a value designating the likelihood, as a percentage value, that an identified developer composed a target code set. As such, a lower percentage can be associated with an increased likelihood of subsequent review of the target code set. Where a malicious programmer masquerades as a trusted developer to submit code to a repository, analysis of the submitted code can indicate that it includes characteristics that sufficiently depart from the trusted developers profile so as to subject the submitted code to further review. Where the submitted code is determined to be composed by someone other than the trusted developer, further action can be undertaken, such as updating the username/pas sword of the trusted developer, legal action, further forensic analysis, countermeasures, etc. In an aspect, where an alert or report is generated in response to a potential intrusion, this alert of report can be received at nearly any target location, target system, target device, target method, etc. As examples, an alert can be received on a mobile device, on a logging system, at a method for quarantining suspect code, on a mobile device thousands of miles away from the code repository, at a thin client in the code repository facility, etc., without departing from the scope of the disclosed subject matter.

The disclosed subject matter can mine information from code repositories, including source code management systems, revision control systems and/or versioning systems, such as, concurrent versions system (CVS), Apache Subversion (SVN), Linux GIT, etc. It will be appreciated that code repositories include nearly any set of stored code. These sets of stored code can be in a large file repository, such as a corporate code repository, but can also be stored on nearly any other storage medium regardless of size or complexity, such as a thumb drive, hard drive, optical drive, cloud storage, RAM, ROM, EEPROM, etc., or nearly any other memory, as disclosed elsewhere herein. The mined information can then be scaled, normalized, trained, or scored using machine learning algorithms to produce a profile including a weighted set of features. Profiles can then be used to make predictions on future code set check-ins to a code repository. The disclosed approach can abstract information in a code repository to profile one or more developers of code in the repository. The abstracted information can be persisted to a data store of developer profiles. The profiles can be employed to train intrusion detection algorithms based on developer history, metrics, propensities, or nearly any other available information. Developer profiles can be updated and kept current based. Similarly, intrusion detection can also be kept current allowing for reanalysis of code sets with updated profiles.

In an aspect, machine learning can include the use of logistical regression techniques. Logistical regression is generally simple to tune, fast, and simple to implement. It will be noted that the subject disclosure is not limited to logistical regression and that any other form of statistical analysis can be employed in conjunction with machine learning without departing from the scope of the presently disclosed subject matter. In an aspect, regularization, to prevent overfitting describing random error or noise instead of the underlying relationship, can be combined with machine learning techniques, e.g., logistical regression, to develop a more generalized curve fit.

In another aspect, gradient descent can be employed in a training phase to develop localized minima of the characteristics of a developer profile. Gradient descent is an iterative algorithm that can work well to determine minimal weight values for characteristics to facilitate classification of distinct developers. In an aspect, gradient descent works in spaces of any number of dimensions, even in nearly infinite-dimensional ones, i.e., very large numbers of dimensions, and can thus be readily employed in optimizations of large numbers of characteristic features. It will be noted that other optimization algorithms can be employed without departing from the scope of the presently disclosed subject matter.

In a further aspect, a support vector machine (SVM) can be employed for developing a profile. The ability of SVM to group characteristics into multiple groups can allow SVM to be an efficient technique when applied to the types of characteristics associated with classifying a code set as composed by a developer or not. In an aspect, SVM does typically include more complexity in debugging, implementation, and additional computational time for training as compared to some regression techniques.

A code characteristic can be any data, fact, or knowledge mined or inferred from source code, generated machine code, repository, logs, or metadata. As such, code characteristics can include spelling variable expansion wherein the spelling consistency of a developer can be analyzed. System 100 can parse words and variable names for a code set for frequency of usage, casing, and other commonalities. Similar to the spelling variable expansion, syntactical keyword expansion can parse coding keywords and variable names to analyze for frequency of usage, casing, and other commonalities.

Code characteristics can further include the byte size of a comment or message associated with code check-in. This can evaluate, for example, how wordy or not wordy a developer is. Another code characteristic can be the size of the change made to the code between code submissions (e.g., the 'diff' per check-in) to evaluate how large of change a developer tends to commit. A further code characteristic can be a day of the week or time of day the developer has a propensity for checking in code or not checking in code, such as the developer checks in code 85% of the time between 3 am and 5 am on Fridays or has a 0% rate for checking in code on National holidays.

Another code characteristic can be brace placement to evaluate a developer's style for placement of a brace, e.g., a closing brace on the same line or the next line. Yet another code characteristic can be regular use of uniform spacing near a keyword.

Code characteristics can also be associated with characteristics such as a check-in temporal distance to evaluates, for example, the mean time between two check-ins performed by a developer on the same source code. The propensity of a developer to check-in code daily, weekly, monthly, etc., can be analyzed.

The spelling performance of a developer can also be evaluated by performing spell check on a commit message. Spelling errors can be employed as characteristic features associated with the developer. Similarly, spelling within the code set itself can also be employed as a characteristic feature. Likewise, a developer's usage of camel casing can be tracked. Camel case is the use of capitalization in positions other than the first letter of a word, e.g., "thESe aRe caMel cASe wOrds".

Another code characteristic can be the number of comments a developer commonly uses compared to the total number of lines in the code check-in. This can be determined, for example, by searching for '//', '/*', and '*/' and comparing the count to the total number of lines in the check-in.

Other code characteristics can include coding styles and patterns, typing notation, underscore as spacing usage or other spacing styles, implicit usage of keywords (e.g., else, default, return, continue, next, etc.) when not required, coding of checking (e.g., variable, null, or Boolean checking (!checked) vs. (checked !=null)), ternary operator usage, variable placement and truncation, "constant identifier" correctness, or other work patterns. Additionally, lexical analysis, including parsers and lattice analysis to develop an overall understanding of the machine patterns a code set, can generate characteristic features that can be employed in profile development. It will be noted that nearly any characteristic feature of a code set, e.g., nearly any data, fact, or knowledge mined or inferred, can be employed in developing a profile for an associated developer without departing from the scope of the present disclosure.

In another aspect, malicious code signature detection can increase the accuracy of detecting intrusion into a code repository. Malicious code signatures can include code used by a developer in contravention to best programming practices. In an embodiment, low levels of malicious code signatures can typically be associated with trusted developers and, as such, higher levels of malicious code signatures can be indicative of an intruder into a code repository. Examples of malicious code signatures can include: banned API usage (e.g., strcpy); potentially hostile library calls (e.g., system( )); potentially hostile keyword usage (e.g., asm); potentially hostile variable assignment (e.g., uid=0); dangerous patterns; etc.

Figure 2:
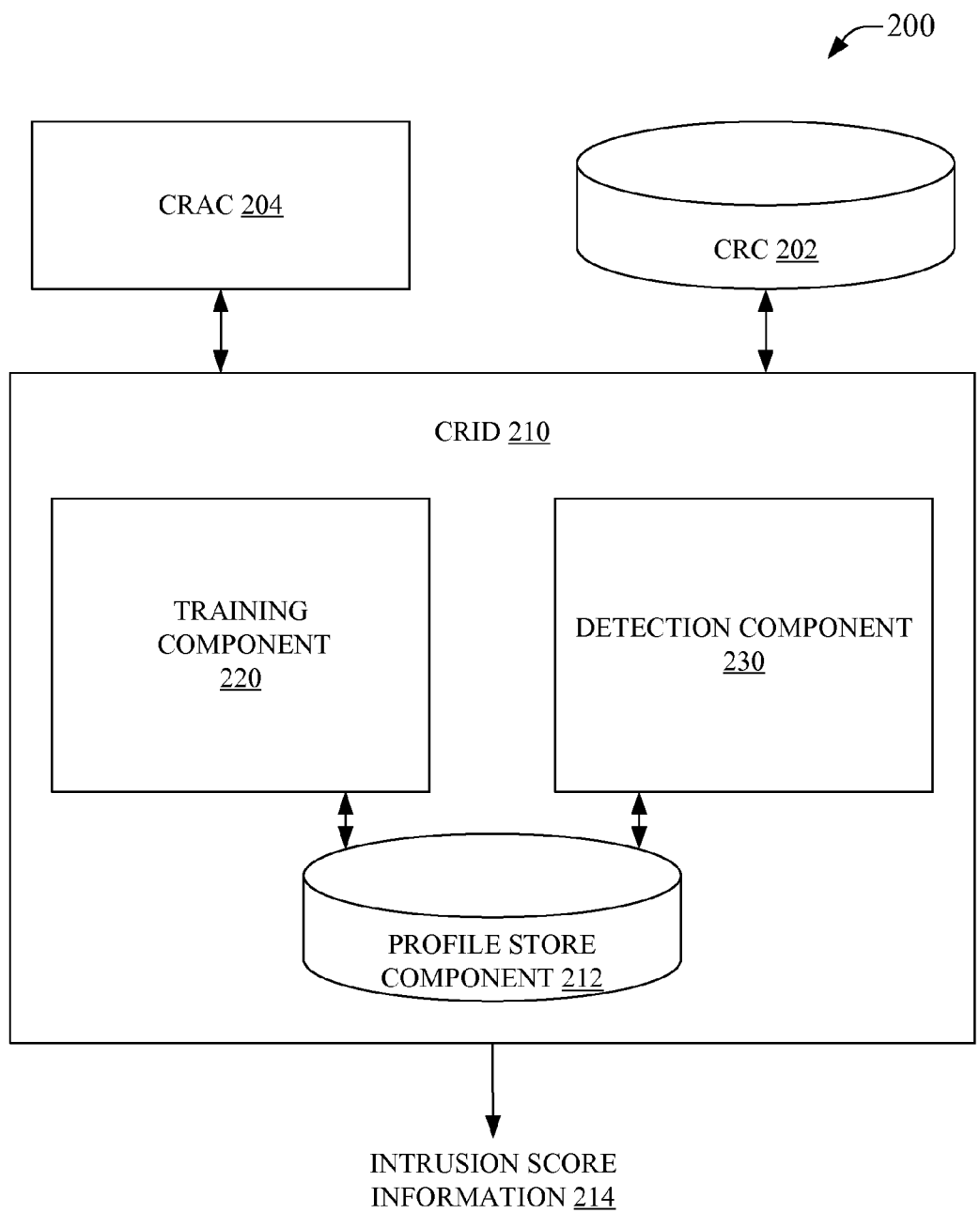
FIG. 2 is a depiction of a system that facilitates code feature analysis and profile development in accordance with aspects of the subject disclosure.

FIG. 2 is a depiction of a system 200 that can facilitate code feature analysis and profile development in accordance with aspects of the subject disclosure. System 200 can include CRC 202 and CRAC 204 communicatively coupled to CRID 210. CRC 202 can comprise a memory, data store, or other data storage component, where code can be stored to facilitate developer access. CRAC 204 can facilitate access to CRC 202. In an aspect, CRID 210 can be inserted into the communicative coupling between CRAC 204 and CRC 202 to facilitate aspects of the presently disclosed subject matter, such as training CRID 210 developer profiles, intrusion detection, etc.

CRID 210 can further include profile store component 212 communicatively coupled to training component 220 and detecting component 230. Profile store component 212 can store a profile of a developer as disclosed herein. In a further aspect, profile store component 212 can also store patterns related to nearly any level of code developer granularity, such as, for a coding project, for a set of code developers (e.g., a developer team, product division, etc.), for some or all code developers of one or more relevant business entities (e.g., all code developers of a corporation, a set of code developers from three cooperating companies, etc.), etc. While these patterns are herein generally affiliated with "a developer" for clarity and brevity, the subject disclosure is not so strictly limited, and "a developer" can be read to include nearly any granularity of code developers, as disclosed, unless explicitly or inherently limited to a single developer. It further will be noted that patterns can include both affirmative patterns, e.g., patterns derived from the presence of indicia, or negative patterns, e.g., patterns derived from the absence of indicia. Training component 220 can develop a profile based on code sets associated with a developer. Training component 220 can store a profile on profile store component 212. Detection component 230 can access a profile stored on profile store component 212 to facilitate determining intrusion score information 214. The determination of intrusion score information 214 can be based on a comparison of a developer profile to a code set. Intrusion score information 214 can be a metric for identifying possible submission of code to a code repository.

In an aspect, training, profile access, and determination of possible intrusion into a code repository can be included in CRID 210. This can facilitate real-time updates to developer profiles as each developer submits code sets for a code repository. In an embodiment, the colocation of training, profile access, and intrusion determination can be embodied in a "black box" CRID 210 component that can be inserted in front of CRC 202 in a relatively seamless manner. This can facilitate the easy installation of an intrusion detection system into conventional code repository systems. In other embodiments, training component 220, profile store component 212, and detecting component 230 can be located in other than internal to CRID 210. As an example, profile store component 212 can be included in CRC 202 rather than in CRID 212.

In another aspect, CRID 210 can interface with a source code editor. In an embodiment, CRID 210 can be communicatively coupled to a source code editor. In a further embodiment, CRID 210 can be integrated into a source code editor. A source code editor can facilitate editing source code and can include, for example a text editor, an integrated development environment (IDE), etc. Where CRID 210 is interfaced to an editor, CRID 210 can have access to real-time developer interactions with the source code editor. These real-time interactions with the source code editor can provide additional information regarding characteristics of a developer that can be included in a developer profile. As an example, where a developer frequently mistakenly keys "hte" [sic] when typing "the", this idiosyncrasy can be tracked even where "hte" [sic] would be corrected before submission to a code repository in most circumstances. Further, an integrated CRID 210 can monitor environmental conditions for the source code editor, such as, other programs running in the background, hardware information, time/day information, login/password features, source code editor software registration information, etc. As an example, where a source code editor serial number is registered to a trusted developer, that editor is running on system with an identifiable CPU and known MAC address, the IP address for the system is in the city that the developer lives in, and the developer is logged into a known email account in the background, these characteristics can be considered to increase the likelihood that code submitted would be from the trusted developer. As a corollary, where code is submitted by a system having a source code editor that is not registered to the trusted developer, the real-time editing of the source code lacks idiosyncratic keying errors associated with the trusted developer, and the IP address is located in a foreign country not associated with the trusted developer, the submitted code can be considered more suspect and be subject to further validation processes before being committed to the code repository. Interfacing CRID 210 with a source editor can allow for developer profiles based on characteristics present in the creation/editing process of code in addition to characteristics determined from analysis of a 'final draft' of the code submitted for inclusion in a code repository.

Figure 3:
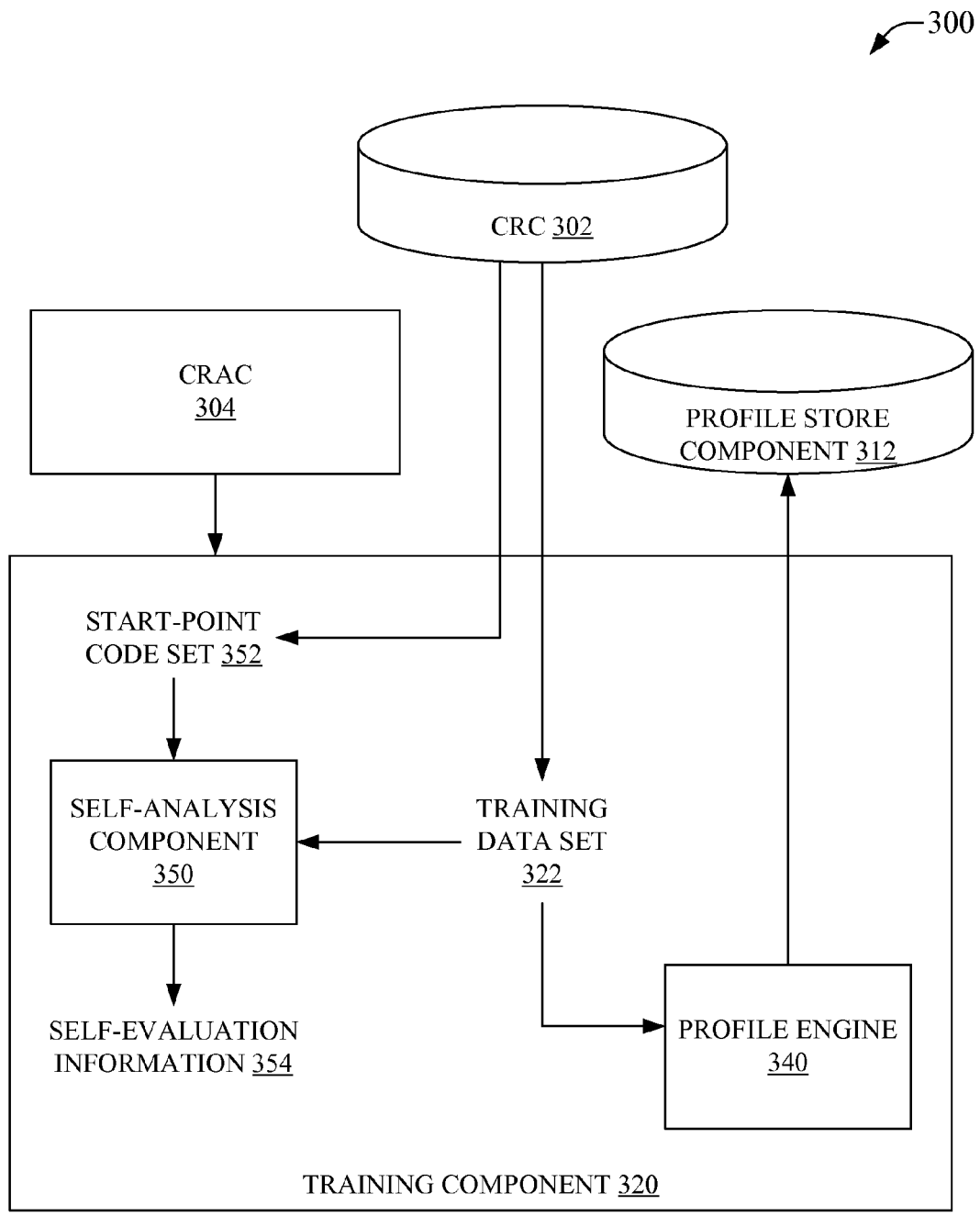
FIG. 3 illustrates a system that facilitates code feature analysis training in accordance with aspects of the subject disclosure.

FIG. 3 illustrates a system 300 that facilitates code feature analysis training in accordance with aspects of the subject disclosure. System 300 can include CRC 302 and CRAC 304 communicatively coupled to training component 320. CRC 302 can comprise a memory, data store, or other data storage component, where code can be stored to facilitate developer access. CRAC 304 can facilitate access to CRC 302. In an aspect, training component 320 can be inserted into the communicative coupling between CRAC 304 and CRC 302 to facilitate aspects of the presently disclosed subject matter, such as training developer profiles.

Training component 320 can further be communicatively coupled to profile store component 312. Profile store component 312 can store a profile of a developer as disclosed herein. Training component 320 can develop a profile based on code sets associated with a developer. Training component 320 can store a profile on profile store component 312.

Training component 320 can access training data set 322. Training data set 322 can comprise source code information associated with a developer and can be used to develop a profile for the developer. In some embodiments, training data set 322 can comprise source code information for a plurality of developers and can facilitate determining profiles for a plurality of developers. Further, in some embodiments, training data set 322 can include a historical set of source code information such as an existing code repository and access log. In another embodiment, training data set 322 can comprise source code information for a plurality of projects for one or more developer profile. As such, where a code repository already includes committed source code, and an intrusion detection system is being added to monitor future code commits and/or examine exiting committed code files, the existing code tree, or parts thereof, can be employed as part of a training data set. As an example, where a company has a code repository with existing code from 100 developers, the existing code can be employed as training data set 322 to generate developer profiles for the 100 developers. These profiles can then be employed to analyze future code check-ins into the code repository.

Further, profiles generated from an existing code repository can be used to check the existing committed code stored in the code repository. Given that a malicious entity might have submitted code into the code repository under the guise of a trusted developer, there can be anomalistic behavior for characteristics of the trusted developer in training data set 322 used to generate a profile for the trusted developer. As an example, where trusted developer has only one code check-in on a Saturday in the entire training data set, the associated committed code can be treated as suspect due to the anomaly. Where that same committed code also has the word "color" spelled "colour" and this characteristic is not present in any other committed code from the trusted developer, the committed code can be treated as more suspect due to a second anomaly. Suspect committed code can be removed from training set 322 before use in generating the trusted developer profile. This can be viewed as akin to disregarding a fastest and slowest lap time when computing an average lap time for a runner. The generated profile can then be run against the committed code and the suspect committed code file can be compared to the developer profile. Where the Saturday check-in and strange use of "colour" are significant in view of the other characteristic features of the trusted developer, the committed code file can be determined to be suspect and subjected to further review processes. As in the previous "runner example", this can be likened to the throwing out the slowest lap time of the runner before calculating the average lap time and then seeing that the average lap time is substantially faster than the slowest lap time and would not easily be attributed to the same runner. However, where the Saturday check-in and strange use of "colour" are, for example, the only two anomalies across perhaps several thousand characteristics of the trusted developer, the level of suspicion for that committed code may be minuscule and the file can be passed over for further inspection. Returning to the "runner example", this can be akin to the throwing out the slowest lap time of the runner before calculating the average lap time and then seeing that the average lap time and the slowest lap time are reasonably close and could easily be attributed to the same runner.

In other embodiments, training data set 322 can include an existing training data set, such as a data set that has been previously manipulated to facilitate training one or more developer profiles. As such, for example, a developer can provide an employer with their existing developer profile, e.g., a developer profile generated at another employer, etc., or with an existing training data set, e.g., a training data set including code files known to be attributable to the developer, to rapidly generate a new profile for the developer. This can facilitate inclusion of new trusted developers into a code repository intrusion detection system in a rapid and efficient manner. Anomalies in the characteristics of the submitted developer profile and/or existing trading data set can be addressed, for example, in a manner as disclosed for using an existing code tree as a training data set.

In some embodiments, training data set 322 can be compiled over time. Training data set 322 can be generated and updated as submitted code accrues. As an example, where training component 320 is included in a new code repository system, there can be no submitted code from which to generate training data set 322. As code is newly submitted by trusted developers into the young code repository, the committed code can be employed as training data set 322. As such, training data set 322 can change with each committed code file. These embodiments can be easily visualized for start-up companies employing new developers that access an essentially empty code tree on the code repository. As the new developers submit code, that code can be used to generate training data sets to generate developer profiles.

Training component 320 can further include profile engine 340 that can generate or update a profile based in part on training data set 322. Profile engine can then facilitate storage of a generated profile on profile store component 312. In an aspect profile engine 340 can analyze training data set 322 based on characteristic features associated with a developer to generate a developer profile. The developer profile can embody one or more characteristics, and in many cases large pluralities of characteristics, to form a pseudo-signature for a trusted developer. Many characteristic features mined form training data set 322 can be quite subtle, such as particular spellings of words, punctuation styles, word orders, repetitive use of select function calls or libraries, comment line usage and placement, time/day of committing code sets, location information, use of identified hardware for submissions, etc. Some of the many possible characteristics are disclosed herein with regard to FIG. 1. It will be appreciated that these and many more characteristics can be employed by profile engine 340 in generating or updating a profile.

Training component 320 can further include self-analysis component 350. Self-analysis component 350 can receive start-point code set 352, which can be stored on CRC 302. Start-point code set 352 can be a snapshot of developed code at any point in time chosen to represent a starting point. Self-analysis component 350 can receive training data set 322 and can extract modifications of the code tree stored on CRC 322 based on training data set 322. Self-analysis component 350 can then generate self-evaluation information 354 based on start-point code set 352 and extracted modifications. This can facilitate generating a historical state of the code tree stored on CRC 302 at any point associated with an extracted modification. In an aspect, this can allow training component 320 to reconstruct the sequential development of the code tree on CRC 302. Profiles can then be checked against the sequential development of the code tree to determine potential intrusions into the code repository.

Figure 4:
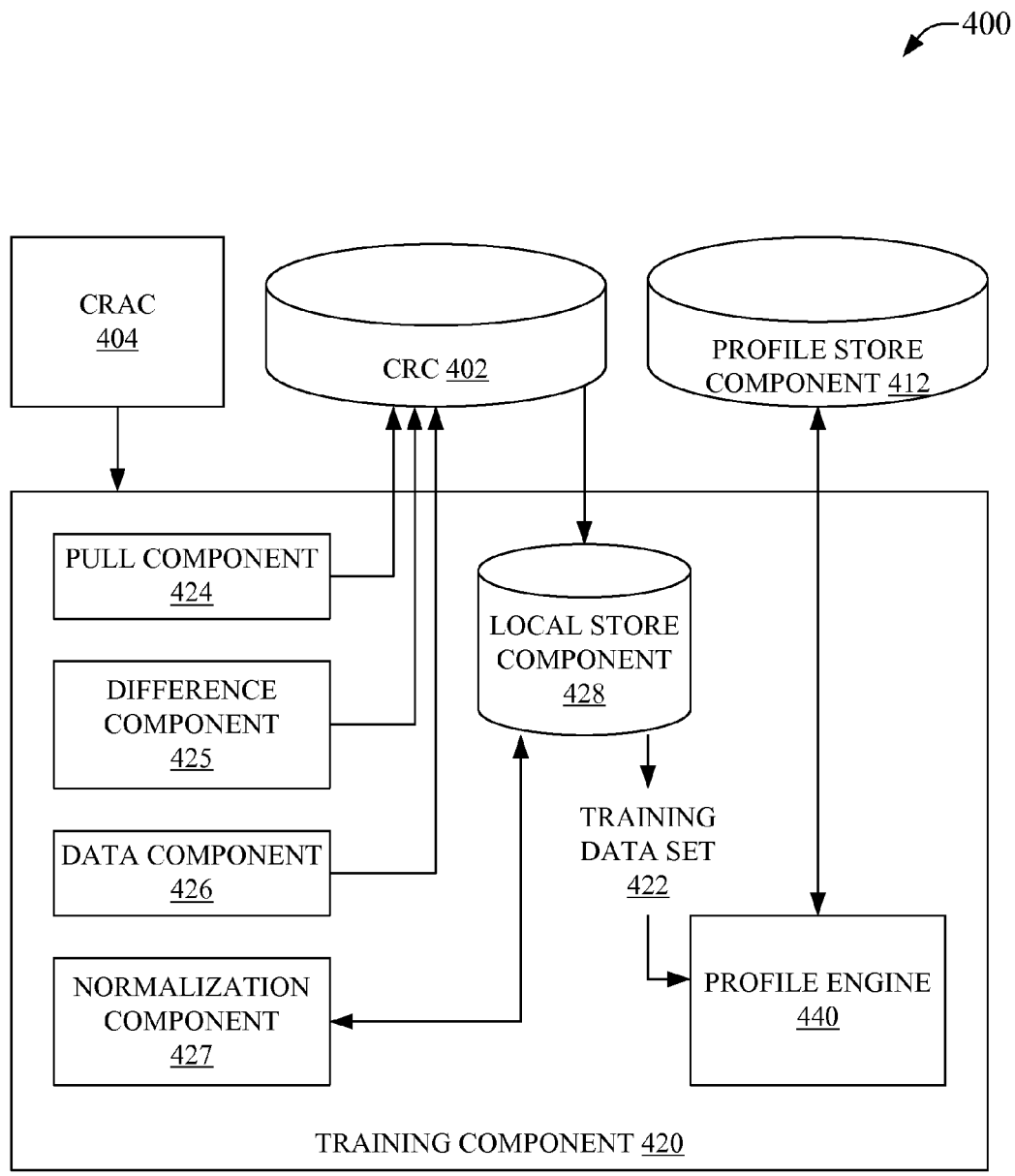
FIG. 4 illustrates a system that facilitates code feature analysis training and development of a training data set in accordance with aspects of the subject disclosure.

FIG. 4 illustrates a system 400 that facilitates code feature analysis training and development of a training data set in accordance with aspects of the subject disclosure. System 400 can include CRC 402 and CRAC 404 communicatively coupled to training component 420. CRC 402 can comprise a memory, data store, or other data storage component, where code can be stored to facilitate developer access. CRAC 404 can facilitate access to CRC 402. In an aspect, training component 420 can be inserted into the communicative coupling between CRAC 404 and CRC 402 to facilitate aspects of the presently disclosed subject matter, such as training developer profiles. Training component 420 can further be communicatively coupled to profile store component 412. Profile store component 412 can store a profile of a developer as disclosed herein. Training component 420 can develop a profile based on code sets associated with a developer. Training component 420 can store a profile on profile store component 412.

Training component 420 can access training data set 422. Training data set 422 can comprise source code information associated with a developer and can be used to develop a profile for the developer. In some embodiments, training data set 422 can comprise source code information for a plurality of developers and can facilitate determining profiles for a plurality of developers. Further, in some embodiments, training data set 422 can include a historical set of source code information such as an existing code repository and access log. Training data set 422 can be stored local to training component 420, such as by storing training data set 422 on local store component 428.

Training component 420 can further comprise pull component 424. Pull component 424 can be communicatively coupled with CRC 402 to cause training component 420 to receive source code information from a code repository, such as a code repository stored on CRC 402. Source code information can include information about individual revisions to a source code file. As an example, pull component 424 can initiate the reception of source code information at training component 420, wherein the source code information can be an initial source code file and each revision of the source code file from a code tree stored in a code repository residing on, for example, CRC 402. In an embodiment, the source code files received by training component 420 can be stored on local store component 428.

Further, training component 420 can comprise difference component 425 that can facilitate training component 420 receiving information on code updates or code snippets committed by a developer for revisions of a source code file. As an example, difference component 425 can initiate the reception of code snippets in a code tree for by training component 420. In an embodiment, the code snippets received by training component 420 can be stored on local store component 428.

Training component 420 can also include data component 426 that can facilitate training component 420 receiving an initial revision of a source code file of a code repository, for example, residing on CRC 402. Data component 426 can persist the initial revision of the source code file on training component 420, for example, by storing a copy of the initial revision on local store component 428. Training component 420 can, at least in part, reconstruct a source code archive from the initial revision received by way of data component 426 and the .code snippets received by way of difference component 425.

In an aspect, the interaction of pull component 424, difference component 425, and data component 426 can provide valuable information about a source code set stored in a code repository at various stages of development. It can be likened to a mapping exercise in which the origination point, destination point, and travel legs can be analogous to an initial source code file, a current source code file, and code snippets related to changes to the source code file. In this example, a pull action can get at the origination and destination information. A difference action can get at the travel legs. A data action can reconstruct the journey by appropriately combining the origination information and the travel leg information. The reconstructed journey can then be compared to the destination information. In an aspect, the information caused to be received by training component 420 by way of pull component 424, difference component 425, and data component 426 can be embodied, at least in part, in training data set 422.

System 400 can further comprise normalization component 427 that can normalize the information received at training component 420 by way of pull component 424, difference component 425, and data component 426. As an example, where code check-in times for a first developer are within minutes of each other and for a second developer are within hours of each other, a check-in time characteristic can be normalized by way of normalization component 427, to hours rather than minutes or days. As another example, a spelling error characteristic can be normalized, by normalization component 427, as a deviation from a mean number of spelling errors for all developers of code in a branch of a code tree. This exemplary spelling error characteristic can be different form a spelling error characteristic for the whole code tree, from a different branch of the tree, from a sub-branch of the tree, etc. As a further example, the size of individual developer's code changes for each submitted code set can be normalized against the average size of code changes across multiple developers. Thus, in this example, where a first developer changes an average of 450 lines of code in 100 submitted code sets, and a second developer changes an average of 650 lines of code in 50 submitted code sets, then where the first developer submits 517 lines of code in a code set under examination, this can be treated as submitting an average sized code set, i.e., the average of 450 lines for 100 sets and 650 lines for 50 sets is 516.666. In an aspect, information normalized by way of normalization component 427 can be embodied, at least in part, in training data set 422.

Training component 420 can further include profile engine 440 that can generate or update a developer profile based in part on training data set 422. Profile engine can then facilitate storage of a generated profile on profile store component 412. In an aspect, profile engine 440 can analyze training data set 422 based on characteristic features associated with a developer to generate a developer profile. The developer profile can embody one or more characteristics, and in many cases large pluralities of characteristics, to form a pseudo-signature for a trusted developer. Many characteristic features mined form training data set 422 can be quite subtle, such as particular spellings of words, punctuation styles, word orders, repetitive use of select function calls or libraries, comment line usage and placement, time/day of committing code sets, location information, use of identified hardware for submissions, etc. Some of the many possible characteristics are disclosed herein with regard to FIG. 1. It will be appreciated that these and many more characteristics can be employed by profile engine 440 in generating or updating a profile.

Figure 5:
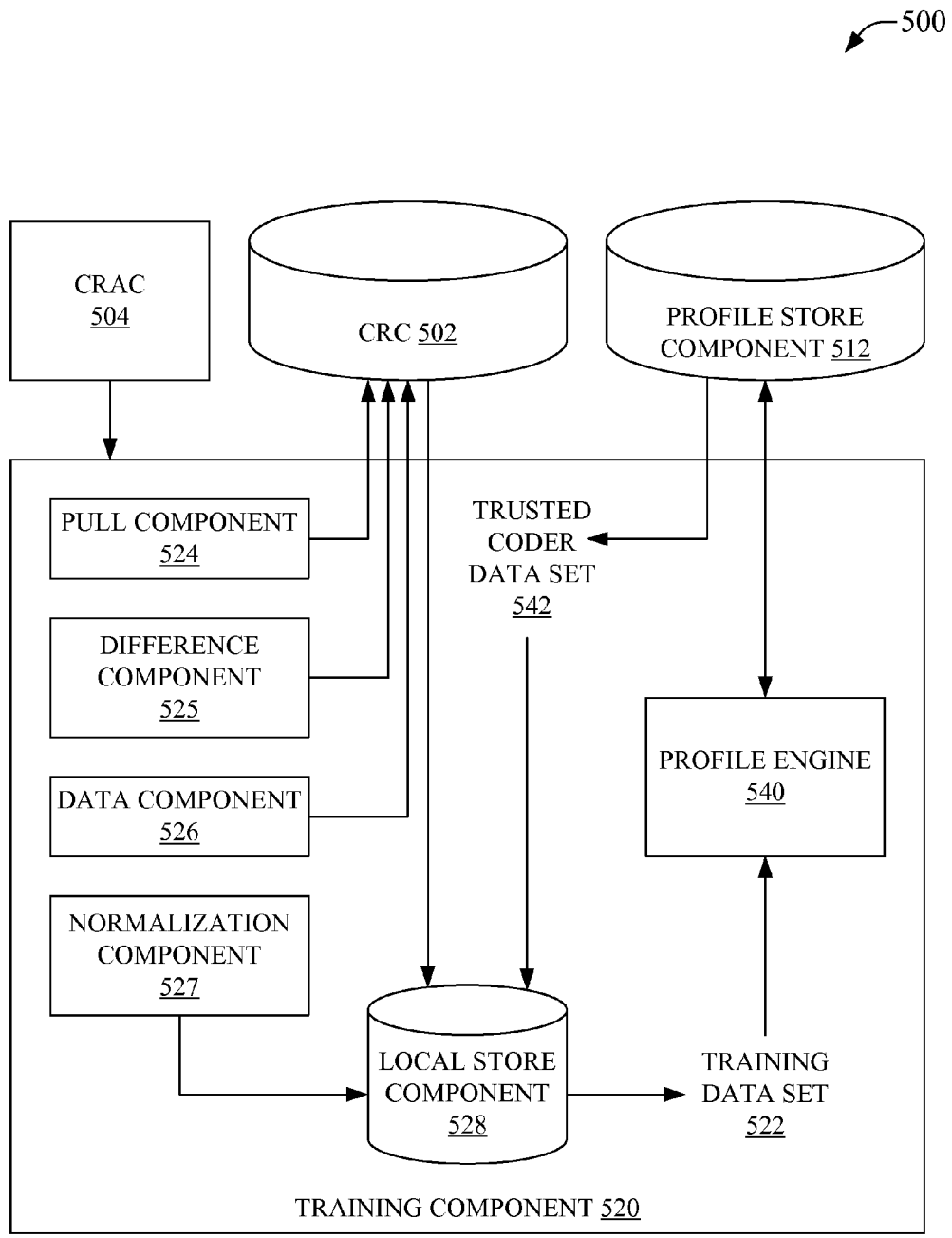
FIG. 5 is a depiction of a system that facilitates code feature analysis training with a trusted coder data set in accordance with aspects of the subject disclosure.

FIG. 5 is a depiction of a system 500 that facilitates code feature analysis training with a trusted coder data set in accordance with aspects of the subject disclosure. System 500 can include CRC 502 and CRAC 504 communicatively coupled to training component 520. CRC 502 can comprise a memory, data store, or other data storage component, where code can be stored to facilitate developer access. CRAC 504 can facilitate access to CRC 502. In an aspect, training component 520 can be inserted into the communicative coupling between CRAC 504 and CRC 502 to facilitate aspects of the presently disclosed subject matter, such as training developer profiles. Training component 520 can further be communicatively coupled to profile store component 512. Profile store component 512 can store a profile of a developer as disclosed herein. Training component 520 can develop a profile based on code sets associated with a developer. Training component 520 can store a profile on profile store component 512.

Training component 520 can access training data set 522. Training data set 522 can comprise source code information associated with a developer and can be used to develop a profile for the developer. In some embodiments, training data set 522 can comprise source code information for a plurality of developers and can facilitate determining profiles for a plurality of developers. Further, in some embodiments, training data set 522 can include a historical set of source code information such as an existing code repository and access log. Training data set 522 can be stored local to training component 520, such as by storing training data set 522 on local store component 528.

Training component 520 can further comprise pull component 524. Pull component 524 can be communicatively coupled with CRC 502 to cause training component 520 to receive source code information from a code repository, such as a code repository stored on CRC 502. Source code information can include information about individual revisions to a source code file. Further, training component 520 can comprise difference component 525 that can facilitate training component 520 receiving information on code updates or code snippets committed by a developer for revisions of a source code file. Training component 520 can also include data component 526 that can facilitate training component 520 receiving an initial revision of a source code file of a code repository. Data component 526 can persist the initial revision of the source code file on training component 520, for example, by storing a copy of the initial revision on local store component 528. Training component 520 can, at least in part, reconstruct a source code archive from the initial revision received by way of data component 526 and the code snippets received by way of difference component 525. In an aspect, the interaction of pull component 524, difference component 525, and data component 526 can provide valuable information about a source code set stored in a code repository at various stages of development. In an embodiment, the source code files, the code snippets or updates, and the initial revisions of a source code file, received by training component 520 can be stored on local store component 528. In an aspect, the information caused to be received by training component 520 by way of pull component 524, difference component 525, and data component 526 can be embodied, at least in part, in training data set 522. System 500 can further comprise normalization component 527 that can normalize the information received at training component 520 by way of pull component 524, difference component 525, and data component 526. In an aspect, information normalized by way of normalization component 527 can be embodied, at least in part, in training data set 522.

Training component 520 can also receive trusted coder data set 542. Trusted coder data set 542 can include information related to the characteristics features of code composed by one or more trusted developers. In an aspect, trusted coder data set 542 can be an existing developer profile or part of an existing developer profile. In another aspect, trusted coder data set 542 can be an existing set of source code files for a trusted developer that could be employed to generate a profile for the trusted developer. In further aspect, trusted coder data set 542 can be an existing set of source code files for a trusted developer that contribute to generation of a profile for the trusted developer but might be insufficient to do so without further information on characteristics of the target developer. In an embodiment, trusted coder data set 542 can be received by way of profile store component 512. Trusted coder data set 542 can be stored locally on local store component 528. In an aspect, trusted coder data set 542 can be embodied, at least in part, in training data set 522.

Training component 520 can further include profile engine 540 that can generate or update a developer profile based in part on training data set 522. Profile engine can then facilitate storage of a generated profile on profile store component 512. In an aspect, profile engine 540 can analyze training data set 522 based on characteristic features associated with a developer to generate a developer profile. The developer profile can embody one or more characteristics, and in many cases large pluralities of characteristics, to form a pseudo-signature for a trusted developer. Many characteristic features mined form training data set 522 can be quite subtle, such as particular spellings of words, punctuation styles, word orders, repetitive use of select function calls or libraries, comment line usage and placement, time/day of committing code sets, location information, use of identified hardware for submissions, etc. Some of the many possible characteristics are disclosed herein with regard to FIG. 1. It will be appreciated that these and many more characteristics can be employed by profile engine 540 in generating or updating a profile.

Figure 6:
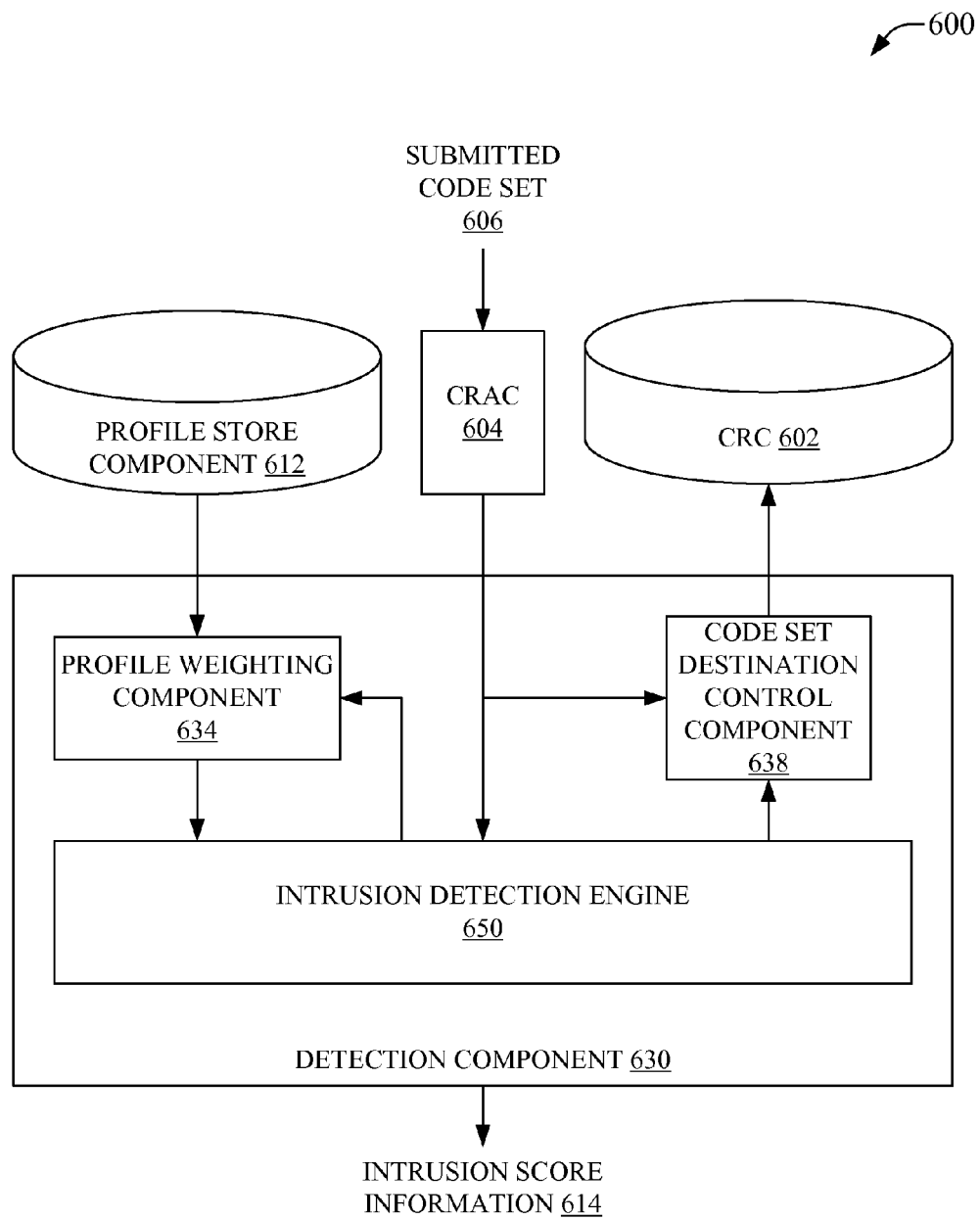
FIG. 6 is a depiction of a system that facilitates code feature analysis with a weighted profile in accordance with aspects of the subject disclosure.

FIG. 6 is a depiction of a system 600 that facilitates code feature analysis with a weighted profile in accordance with aspects of the subject disclosure. System 600 can include CRC 602 and CRAC 604 communicatively coupled to detection component 630. CRC 602 can comprise a memory, data store, or other data storage component, where code can be stored to facilitate developer access. CRAC 604 can facilitate access to CRC 602, for example, submitted code set 606 can be directed to CRC 602 by way of CRAC 604. In an aspect, detection component 630 can be inserted into the communicative coupling between CRAC 604 and CRC 602 to facilitate aspects of the presently disclosed subject matter, such as employing developer profiles to detect intrusions into a code repository. As an example, submitted code set 606 can include a source code file submitted by a malicious entity posing as a trusted developer. Without an intrusion detection system, it is possible that the submitted source code file would be incorporated in the source code stored in the code repository and could end up in a build of the source code, where the intentions of the malicious entity could be realized. Detection component 630 can further be communicatively coupled to profile store component 612. Profile store component 612 can store a profile of a developer as disclosed herein. Detection component 630 can receive a profile associated with a developer.

Detection component 630 can include intrusion detection engine 650. Intrusion detection engine 650 can determine intrusion score information 614 based on an analysis of submitted code set 606 in view of one or more developer profile. Developer profiles can be received by way of profile store component 612. Developer profiles can be adjusted by profile weighting component 634. Profile weighting component 634 can receive information on characteristic features to be included in an analysis of submitted code set 606 by way of intrusion detection engine 650. Profile weighting component 634 can weight developer profiles to adjust the impact of the characteristics represented therein.

As an example, where submitted code set 606 does not include location information related to the geographic location of the device used to submit the code files comprising submitted code set 604, intrusion detection engine 650 can indicate that location characteristic features of developer profiles will be ignored. In response to this indication, profile weighting component 634 can designate a weight factor for location information to zero, causing any location information in employed developer profiles to have no effect.

As a second example, developers can have been instructed to include specific numerical sequences in their previously submitted code files. In this example, a weight factor can increase the effect of a developer profile having, or not having, these specific numerical sequences included in a relevant subset of source code employed in generating their developer profiles. As such, where these developers included the sequence in their historical code, this will be a generally positive indicator of their identity when the weighting is adapted to give relevance to the historic presence of the sequence in historical code. While the sequence may not be present in submitted code set 606, intrusion detection engine 650 can indicate that the developers of interest should have historically been including the sequence in their previously submitted code, e.g., the code employed in generating their profiles. As such, there should be an increased reliance on finding the sequence as a characteristic feature in confirming that the code base used to create the relevant developer profile is indeed based on code composed by the trusted developer. Where there is greater confidence that the trusted developer profile is not compromised, there can be greater confidence in the determined intrusion score information 614.

In an embodiment, weighting factors can be embodied in a separate data component, such as a matrix or vector, that can be created once to reflect the weighting determinations of intrusion detection engine 650, such that this separate data component can then be applied to one or more developer profile, such as by simple matrix operations, vector multiplication, etc. This can avoid modification of the one or more developer profiles themselves. Further, the weighting factors can be compiled once for application to all included developer profiles. As examples, weighting factors can be determined for a single developer, for a single coding project, for a single business entity, for a joint project between business entities, for a set of code developers, for a group of project, for an entire code repository, for all developers across one or more code repositories, or for nearly any other level of tuning, without departing from the scope of the presently disclosed subject matter.

In an aspect, intrusion detection engine 650 can analyze submitted code set 606 to determine characteristic features. A subset of these characteristic features, including none, some, or all of the determined characteristic features, can be employed in an analysis against one or more developer profiles, including weighted developer profiles as disclosed herein. As an example, submitted code set 606 can include that it was submitted by a trusted developer, include an unusual style of designating a comment line, a set of 14 words that are regularly spelled in the same incorrect manner in the submitted source code files, and can have time/day stamps corresponding to the prescribed submission policies of the owner of the code repository. Continuing the example, the profile of the trusted developer can be received from profile store component 612. Profile weighting factor 634 can apply a zero weight factor to all characteristic features other than comment line features, spelling features, and temporal features of the developer's profile, in effect affording them no consideration. Moreover, the temporal features can be reduced in effect, and the spelling features increased in effect, by adjusting corresponding weighting factors by way of profile weighting component 634. Intrusion detection engine can then compare the characteristic features of the submitted code set to the weighted characteristic features of the trusted developer profile. Where 13 of the 14 regularly misspelled words match common misspelling patterns of the trusted developer as embodied in the developer profile, the comment style is a close match to the developer profile, and the time/day stamps are within typical temporal windows indicated it the developer profile, it can be concluded that there is a only a marginal possibility that the submitted code set was not authored by the indicated developer. As such, the submitted code can be accepted for committal to the code repository without further investigation. The level of certainty that the author of submitted code set 606 can be embodied in intrusion information score 614.

Adapting the preceding example, where submitted code set 606 pertains to highly sensitive source code, the marginal possibility that the submitting developer is not the trusted developer can be sufficient to cause further investigation of the submitted code. In effect, the level of confidence in authorship can be used as a trigger for further investigation. The sensitivity of the trigger can be adjusted by adapting a predetermined threshold trigger level. As an example, a threshold can be 65% confidence for non-critical code submissions, 85% for critical code submissions, and 99% for high security code submissions. Thus, a determined confidence of 88% would not trigger further investigation except for high security code submissions.

System 600 can further comprise code set destination control component (DEST) 638. DEST 638 can facilitate queuing of submitted code set 606 subsequent to determination of intrusion score information 614. In an aspect, DEST 638 can hold submitted code set 606 while an intrusion analysis is conducted, such that where there is sufficient confidence, the submitted code set 606 can then be committed to CRC 602. Where there is insufficient confidence, submitted code set 606 can be subjected to further scrutiny before committal to the code repository. In another aspect, submitted code set 606 can be committed to CRC 602 by DEST 638 while DEST 638 restricts access to the written location on CRC 602 until an intrusion analysis is satisfactorily completed, e.g., a quarantine of submitted code set 606 on CRC 602. It will be appreciated that numerous other techniques for tracking, monitoring, quarantining, or buffering submitted code set 606 can be implemented without departing from, and that all such techniques are considered within, the scope of the present subject matter.

Figure 7:
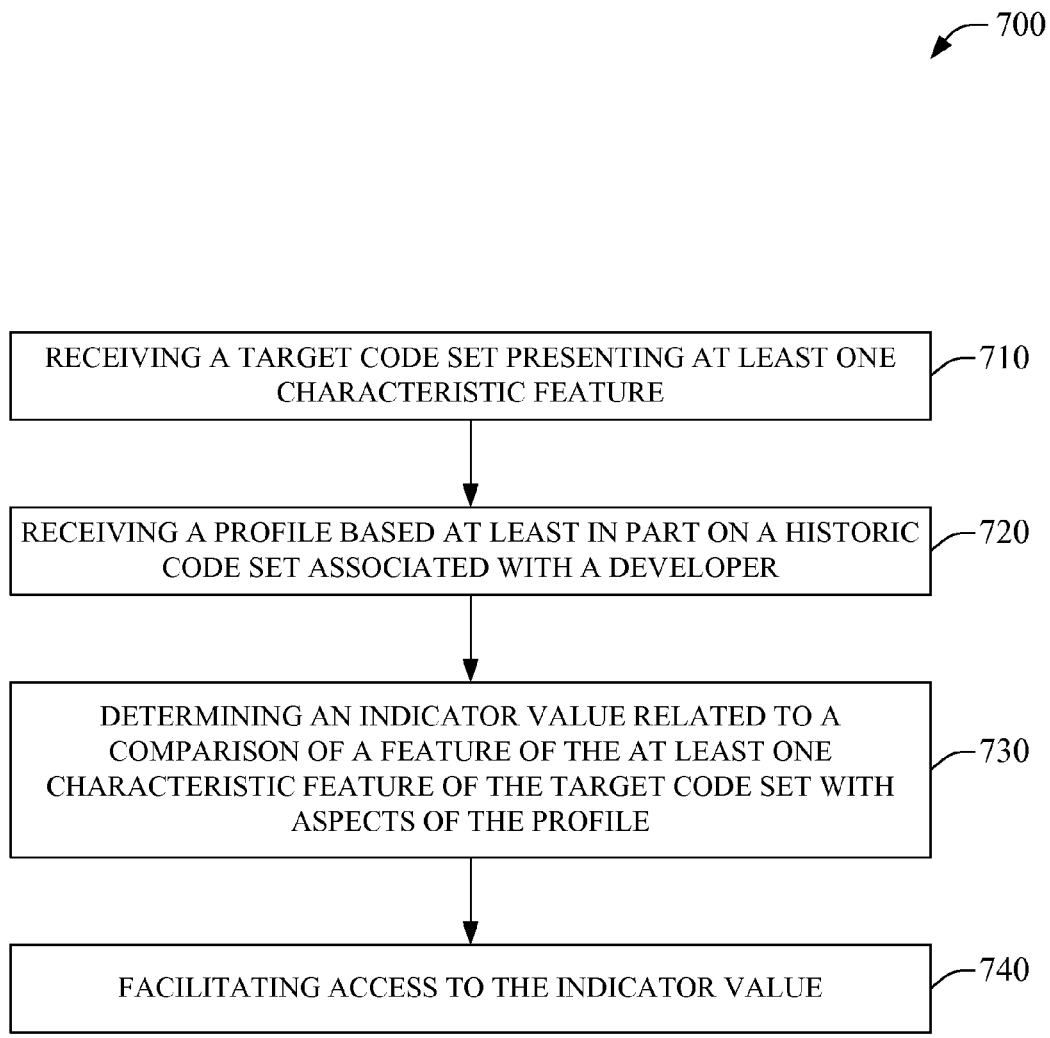
FIG. 7 illustrates a method for facilitating code feature analysis in accordance with aspects of the subject disclosure.
Figure 8:
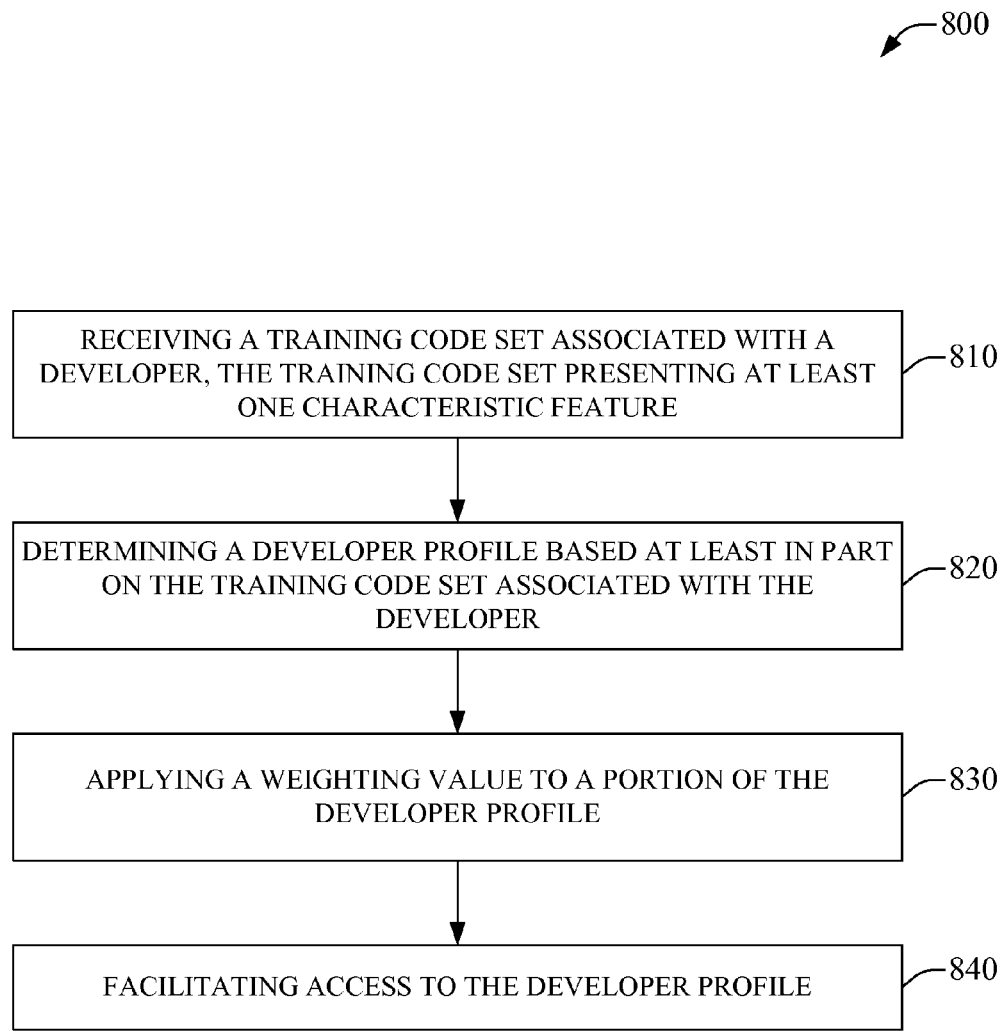
FIG. 8 illustrates a method for facilitating code feature analysis profile development in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates aspects of method 700 facilitating code feature analysis in accordance with aspects of the subject disclosure. At 710, a target code set can be received for analysis. The target code set can present at least one characteristic feature that can be employed in the analysis. Characteristic features can include those described elsewhere herein. The characteristic features can represent patterns associated with code composed by specific individual developers. These characteristics, when taken in combination, can be employed in associating other code with the individual developers. In an aspect, the characteristic features can act as a pseudo-signature. Characteristic features can include features of the code itself, such as spelling patterns and commenting styles, patterns associated with creation and submission of code, such as time/day and submission geographic location patterns, patterns associated with environmental factors associated with the code, such as MAC addresses and other software running in the background, etc. It will be appreciated that nearly any aspect surrounding the composition and submission of source code files can be employed as a characteristic feature in forming profiles, or analysis based on these profiles, for code repository intrusion detection as disclosed herein, and that all such aspects are considered within the scope of the present disclosure.

At 720, a profile can be received, such as a developer profile. The profile can be based, at least in part, on a historic code set, such as a set of source code previously composed by a developer. In some embodiments, the historic code set can be comprised of historic code for a plurality of developers including the entity associated with the profile. The profile can reflect determined historical characteristic features associated with a developer. As an example, where a developer nearly always includes a comment line that includes her name and a large prime number, and where the same developer only occasionally spells 'color' as 'colour', a profile of the developer can indicate a that there is a high likelihood of finding a comment line with the developers name and a large prime number and a moderate likelihood of finding the word 'color' spelled in the American or English style and that these two characteristic features can be employed as factors in determining if a target code set is composed by the same developer. As such, in this example, target code that lacks the diverse forms of 'color' may, or may not, be attributable to the developer because there is only a moderate likelihood of finding the diverse forms of that particular word in code composed by that particular developer. However, where the same target code also lacks the developers name and a large prime number in a comment line, it can be more likely that the developer is not the author of the code based on the historical propensity of the developer to include this particular comment line content in her code. Where a large plurality of characteristic features can be learned and leveraged for developer profiles, the accuracy of determining a developer's affiliation with a target code set can become a useful tool. As such, where source code is submitted to a code repository, the source code can be checked against the purported author of the code, such that where the purported author may not be the actual author of the code, further actions can be taken before the submitted source code is relied on, for example, in a commercialized product, secure environment, etc.

At 730, an indicator value can be determined that is related to a comparison of a characteristic feature of the target code set with aspects of the profile. The indicator value can represent a level of confidence that the target code is composed by the developer associated with the profile. The determination can include weighting of the characteristic features to be analyzed. In an aspect, this weighting can be employed to reduce computation by giving a zero weight to characteristic features that are not present in the target code set. As an example, where the target code set lacks MAC address, developer name, use of special characters, and submission location characteristics, these characteristic features can be weighted to zero, such as by multiplication by a scalar zero value. In some embodiments, these weightings can be in the form of a vector or matrix and applied to a plurality of developer profiles to be compared to the target code set.

At 740, system 700 can facilitate access to the indicator value. At this point, method 700 can end. Access to the indicator value can be associated with reporting processes, subsequent review processes, quarantining processes, profile update processes, etc. As an example, an indicator value can be accessed by a reporting component such that where the indicator value transitions a threshold value, a report is generated and where the indicator value transitions a second threshold level an alert is generated in addition to the report. This can facilitate a tiered reporting and response to potential code repository intrusions. As a second example, the indicator value can also be accessed by a review component that designates review of the source code set by another developer. As such, depending on the indicator value, different review policies can be observed, such as inter-group review for indicator values within a range of confidence in authorship values and extra-group review for indicator values outside of that range of confidence in authorship values.

In an aspect, method 700 can be employed to confirm authorship, refute authorship, or determine authorship from a group of potential authors. In an embodiment, a target code set can be analyzed against a profile of a purported developer such that a measurement of the likelihood that that developer either did, or did not, compose the target code set. In another embodiment, where a purported developer is not included with the target code set, the target code set can be run against a set of developer profiles. The indicator value determined can be associated with ranking the set of developer profiles based on the likelihood that they composed the target code set. As such, where a first developer of the set has more matches of significance for characteristic features than a second developer for the analysis of the target code set, then the first developer can be ranked as more likely to have composed the target code set than the second developer. Further, the likelihood that the first developer composed the target code set can be evaluated directly, e.g., while the first developer is more likely than the second developer to have composed the target code set, it is still unlikely that the first developer did indeed compose the target code set based on fewer substantial correlations to the characteristics of the target code set than a predetermined threshold level. In practice, this can allow a code repository to check submitted code files against a library of authorized developers to determine which files are likely composed by which developers and which code files are likely not composed by any authorized developer. Therefore, even where a first authorized developer submits a code set including a code file from a second authorized developer, this dual authorship can be noted without suspicion that an unauthorized developer has actually intruded into the code repository.

FIG. 8 illustrates aspects of method 800 facilitating code feature analysis profile development in accordance with aspects of the subject disclosure. At 810, method 800 can include receiving a training code set associated with a developer. The training code set can include source code files wherein the source code presents at least one characteristic feature as disclosed elsewhere herein.

At 820, a developer profile can be determined based on the training code set. In an aspect, determining the developer profile can include generating a new developer profile. In another aspect, determining the developer profile can include updating an existing developer profile. Determining the developer profile can include determining one or more characteristic features present in source code included in the training code set. Further, the determination of the developer profile can include generating a cost path across the one or more characteristic features.

At 830, weighting of the cost path can occur to adjust the significance of portions of the cost path across the characteristic features embodied in a developer profile. Weighting can increase or decrease the effect resulting from encountering a particular characteristic feature, or set of characteristic features, in conjunction with an intrusion analysis employing a developer profile. As an example highly unique characteristic features, such as special character sequences hidden in source code by a developer as a way of signing the source code, can be given greater weight than frequent but common characteristic features, such as common alternative spelling of words, for example, 'meter' in place of 'meter'. As such, the inclusion of a highly unusual sequence of characters in many source code files associated with a particular developer can be strongly weighted in that developer's profile, such that when future code is checked against that developer's profile, the presence or lack of that unusual sequence of characters, as a result of the weighting, can more strongly impact the computed validation score for that developer as the composer of the future code than it otherwise would.

In some embodiments, normalization can be conducted to reduce redundancy of data in the resulting developer profile. This can reduce larger collections of data in the profile into smaller sets of interrelated data to facilitate the isolation of data such that additions, deletions, or modifications of data can propagate through a profile by way of the defined relationships. Further, normalization can include adapting developer profiles to allow them to be analyzed by comparable metrics. As an example, a characteristic feature for a first developer can be determined to be "60" while the same feature on a second developer profile is determined to be "580" even though the significance of the characteristic features of the two profiles is equivalent. As such, the second developer can be normalized to the first developer to allow results for analysis against the two profiles to be comparable, such as scaling the second profile by a factor of 10 so that the score is normalized to "58".

Updating an existing developer profile can also include determining one or more characteristic features present in source code included in the training code set and generating a cost path across the one or more characteristic features. However, updating the existing developer profile includes adapting the existing cost path and characteristic features associated with the developer in view of any new characteristic features gleaned from the training code set or cost path determined for those characteristic features. Moreover, weighting can include consideration of weighting present in the existing developer profile. Similarly, normalization can be applied during updating of a developer profile to facilitate lower data redundancy and comparable metrics between developer profiles.

At 840, access to the developer profile can be facilitated. At this point, method 800 can end. Access to the developer profile can be short or long term. As an example of short-term access, determining a developer profile from a set of source code known to be attributable to the developer, and promptly employing that profile in validating a target source code set against the developer profile. As an example of long term access, a developer can have a profile generated, such as by an independent validating organization, and retain their developer profile on a storage medium, such as a file on a portable drive, thumbdrive, CD, DVD, as a file in a cloud storage medium, etc., such that the developer profile can be supplied to interested parties, such as contracting employers, to validate code submitted by the developer hired by the contracting employer. As another example of long-term access, developer profiles can be stored by an entity associated with a code repository, such a corporation who operates a code repository, allowing the entity to catalog developers over time. As such, code can be checked against a subset of the full set of cataloged developer profiles. This can be helpful, for example, where a developer leaves a company and later uses their knowledge of the former employer's code repository an procedures to attempt to infiltrate the code repository. This can occur by identifying code submitted by the developer through comparison to their developer profile cataloged by the former employer. As such, this type of identified source code can be reported to the employer security team and the code can be subject to further scrutiny.

Figure 9:
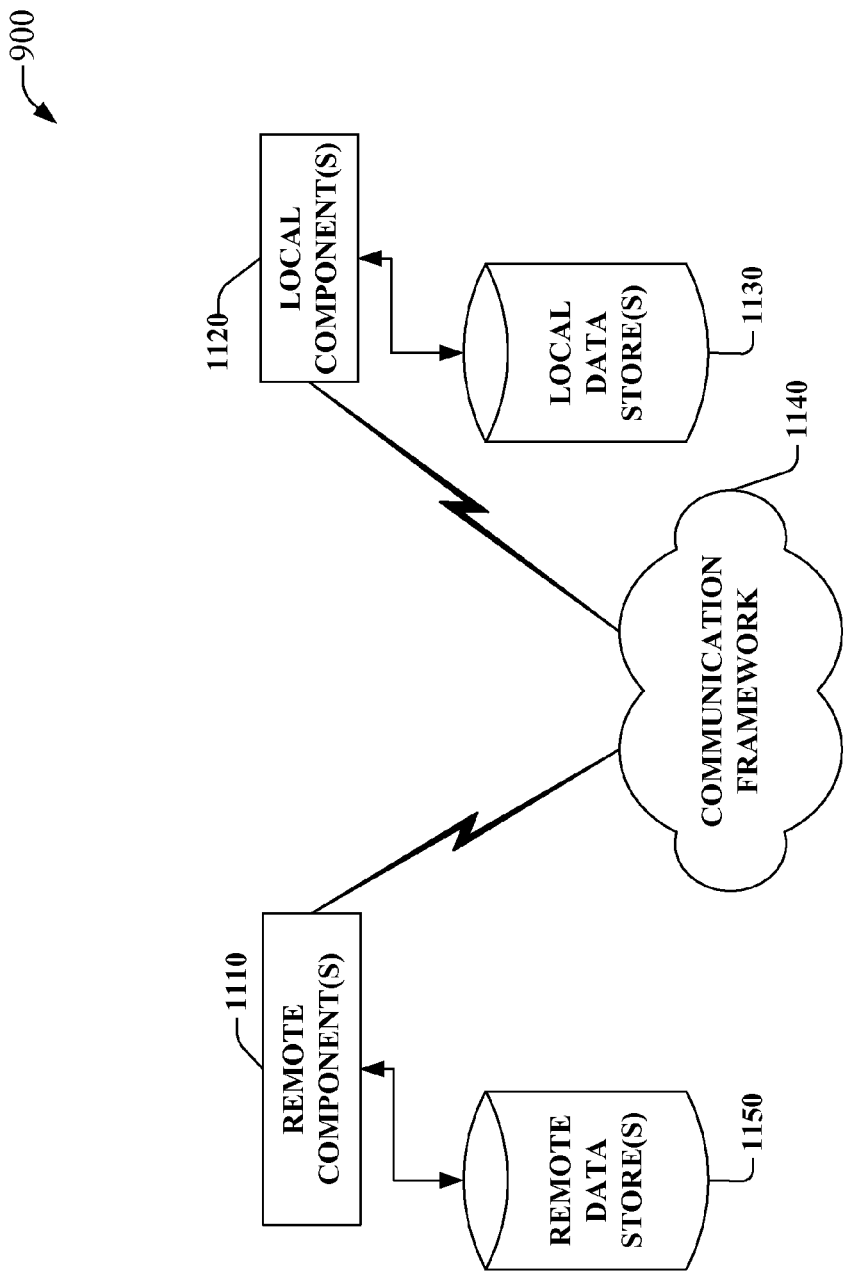
FIG. 9 depicts a schematic block diagram of a sample-computing environment with which the claimed subject matter can interact.

FIG. 9 is a schematic block diagram of a sample-computing environment 900 with which the claimed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include CRAC 104-604. As an example, remote component(s) 910 can be a developer's home computer (remote from a target server) that has an interface, e.g., CRAC 104, etc., for submitting code to a code repository on a target server. In some embodiments, CRID 110-610 can be included in remote component(s) 910.

The system 900 also includes one or more local component(s) 920, which can include server-side component(s). The local component(s) 920 can be hardware and/or software (e.g., threads, processes, computing devices). In some embodiments, local component(s) 920 can include CRC 102-602. As an example, local component(s) 920 can be a target server housing a code repository that can receive code submissions from remote component(s) 910, by way of an interface, e.g., CRAC 104, etc. In some embodiments, CRID 110-610 can be included in local component(s) 920. The local component(s) 920 can house threads to perform transformations by employing the subject innovation, for example.

One possible communication between a remote component(s) 910 and a local component(s) 920 can be in the form of a data packet adapted to be transmitted between two or more computer processes. As an example, a code set can be communicated between a code developer's computing system, e.g., remote component 910, and a code repository, e.g., a local component 920. The system 900 includes a communication framework 940 that can be employed to facilitate communications between the remote component(s) 910 and the local component(s) 920. The remote component(s) 910 are operably connected to one or more remote data store(s) 950 that can be employed to store information on the remote component(s) 910 side of communication framework 940. Similarly, the local component(s) 920 are operably connected to one or more local data store(s) 930 that can be employed to store information on the to the local component(s) 920 side of communication framework 940.

Figure 10:
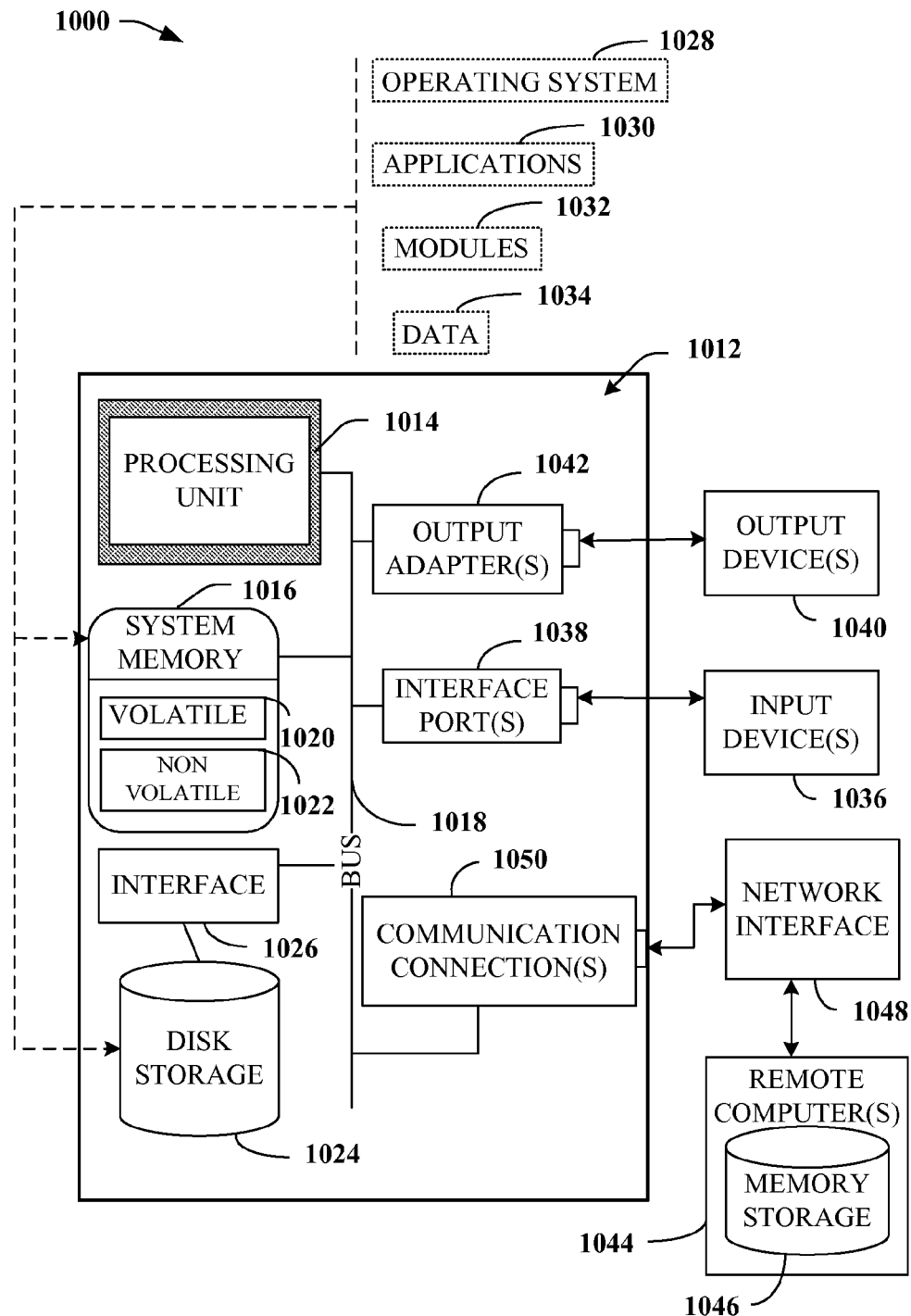
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be employed, for example, by a developer to submit code to a code repository, e.g., CRC 102-602, includes a processing unit 1014, a system memory 1016, and a system bus 1018. Computer 1012 can also comprise, for example, CRID 110, 210, training component 320-520, or detection component 630. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a developer can submit source code to a code repository, such as thorough CRID 110, 210, etc., by way of a user interface embodied in a touch sensitive display panel allowing a developer to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a memory that stores computer-executable instructions; and
    a processor, communicatively coupled to the memory, that facilitates execution of the computer-executable instructions to at least:
        receive a training code file set, wherein one or more code files of the training code file set comprise source code;
        ascribe a characteristic feature to an entity in response to identifying the characteristic feature from the training code file set, a code file of the training code file set, or a computer instruction of a code file of the training code file set;
        associate a frequency of occurrence value, and a uniqueness value, with an entity profile related to the entity in response to determining the frequency of occurrence value and the uniqueness value for the characteristic feature;
        determine a feature value related to the characteristic feature; and
        facilitate access to the feature value.

2. The system of claim 1, wherein the training code file set is related to an analysis of a target code file set.

3. The system of claim 1, wherein the training code file set includes a plurality of historical code files associated with the entity and the characteristic feature is present in two or more of the plurality of historical code files.

4. The system of claim 1, wherein the training code file set includes a plurality of historical code files associated with a plurality of entities, including the entity, and the characteristic feature is present in less than all of the plurality of historical code files.

5. The system of claim 4, wherein the characteristic feature is present in code files of the plurality of historical code files associated with less than all of the plurality of entities.

6. The system of claim 1, wherein the feature value is based, at least in part, on the frequency of occurrence value and the uniqueness value.

7. The system of claim 1, wherein a cost path across a plurality of identified characteristics including the characteristic feature is determined, based in part on the feature value, the frequency of occurrence value, and the uniqueness value, wherein the cost path is further associated with the entity profile.

8. The system of claim 7, wherein one or more weighting factors are applied to the cost path based on the frequency of occurrence value or the uniqueness value, to modify the effect of the characteristic feature in a future analysis employing the cost path.

9. The system of claim 1, wherein the characteristic feature is analyzed against the entity profile based on the feature value.

10. The system of claim 9, wherein the analysis of the characteristic feature against the entity profile determines an identity value associated with a level of confidence that a target code file set is, at least in part, attributable to the entity associated with the entity profile.

11. The system of claim 9, wherein the characteristic feature is analyzed against a set of entity profiles, including the entity profile, based on the feature value, wherein the analysis determines an identity value associated with a level of confidence that a target code file set is, at least in part, attributable to one or more entities of the set of entity profiles.

12. The system of claim 9, wherein a target code file set, or a portion thereof, is subjected to further scrutiny based on a determined identity value satisfying a predetermined condition, wherein the determined identity value is associated with a level of confidence that the target code file set is attributable to the entity.

13. A method, comprising:
receiving, by a system including a processor, a code file set including one or more code files comprising source code, wherein the code file set comprises a training code file set;
in response to analyzing, by the system, the one or more code files comprising the code file set, identifying, by the system, a characteristic feature present in at least a portion of the code file set;
determining, by the system, a frequency of occurrence value for the characteristic feature;
determining, by the system, a uniqueness value for the characteristic feature;
associating, by the system, the frequency of occurrence value and the uniqueness value with an entity profile associated with an identity;
determining, by the system, a feature score for the characteristic feature; and
facilitating, by the system, access to the feature score.

14. The method of claim 13, wherein the identifying the characteristic feature includes identifying the characteristic feature as part of training the entity profile associated with the identity.

15. The method of claim 14, wherein the receiving the training code file set includes receiving a plurality of historical code files associated with a plurality of identities, and the identifying a characteristic feature includes identifying the characteristic feature as part of training a plurality of profiles comprising the entity profile.

16. The method of claim 13, wherein identifying the characteristic feature includes determining one or more weighting factors to be applied to a cost path based on the uniqueness value.

17. The method of claim 16, wherein identifying the characteristic feature includes determining one or more weighting factors to be applied to a cost path based on the frequency of occurrence value.

18. The method of claim 13, further comprising:
determining a cost path across a plurality of identified characteristics, including the characteristic feature, based in part on the feature score, the frequency of occurrence value, and the uniqueness value; and
associating the cost path with the entity profile.

19. The method of claim 13, wherein the receiving a code file set includes receiving a target code file set and the identifying the characteristic feature includes analyzing a target code set against the entity profile associated with the identity.

20. The method of claim 19, wherein the analyzing the target code set includes determining an identity value associated with a level of confidence that the target code file set is, at least in part, composed by an entity associated with the identity.

21. The method of claim 19, wherein the analyzing the target code set includes analyzing the target code set against a set of profiles associated with a plurality of identities, including the identity and determining an identity value associated with a level of confidence that the target code file set is, at least in part, composed by an entity associated with an identity of the plurality of identities associated with the set of profiles.

22. The method of claim 19, wherein the analyzing the target code set includes subjecting at least a portion of the target code set to further scrutiny based on determining an identity value that satisfies a predetermined condition, the identity value being associated with a level of confidence that the target code file set is attributable to an entity associated with the identity.

23. A computer-readable storage device comprising computer-executable instructions that, in response to execution, cause a device including a processor to perform operations, comprising:
receiving a training code file set, wherein one or more code file of the training code file set comprises source code;
associating a characteristic feature with an entity in response to identifying the characteristic feature from the training code file set, a code file of the training code file set, or a computer instruction of a code file of the training code file set;
associating a frequency of occurrence value, for the characteristic feature, with an entity profile related to the entity;
associating a uniqueness value, for the characteristic feature, with the entity profile;
determining a feature value related to the characteristic feature based on the entity profile; and
determining an intrusion score based on a determined level of confidence that a target code set is authored by a developer based on the feature value.

24. The computer-readable storage device of claim 23, wherein the operations further comprise:
- receiving a target code file set, wherein one or more target code files of the code file set comprise source code;
- receiving a developer profile comprising a set of characteristic feature values associated with a presence of characteristic features correlated to historical code files associated with the developer profile; and
- determining an update to the developer profile based on analysis of characteristic features associated with the training code set.

25. The computer-readable storage device of claim 23, wherein the operations further comprise:
- facilitating further scrutiny of the target code set based on the intrusion score satisfying a predetermined condition associated with the developer profile.

* * * * *